(12) United States Patent
Fritz et al.

(10) Patent No.: US 11,217,831 B2
(45) Date of Patent: Jan. 4, 2022

(54) SAFETY APPARATUS FOR A BATTERY

(71) Applicant: Dr. Ing. h.c. F. Porsche Aktiengesellschaft, Stuttgart (DE)

(72) Inventors: Thomas Fritz, Loechgau (DE); Armin Steck, Renningen (DE); Marcus Zacher, Sindelfingen (DE); Dominik Lembke, Stuttgart (DE); Ralf Keller, Pforzheim (DE); Maximilian Mueller, Leonberg (DE); Marc Patt, Steinheim (DE); Markus Graef, Ostfildern (DE); Philipp Straub, Korntal-Muenchingen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 170 days.

(21) Appl. No.: 16/689,182

(22) Filed: Nov. 20, 2019

(65) Prior Publication Data

US 2020/0161717 A1 May 21, 2020

(30) Foreign Application Priority Data

Nov. 20, 2018 (DE) .................... 10 2018 129 158.2

(51) Int. Cl.
*H01M 10/42* (2006.01)
(52) U.S. Cl.
CPC .. *H01M 10/425* (2013.01); *H01M 2010/4271* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 2018/0079316 A1* | 3/2018 | De Lira | B60L 50/66 |
| 2018/0170206 A1* | 6/2018 | Kim | B60K 1/04 |
| 2018/0366792 A1* | 12/2018 | Stachewicz | B60L 50/64 |

FOREIGN PATENT DOCUMENTS

| | | |
|---|---|---|
| DE | 10 2013 006 809 | 10/2014 |
| DE | 10 2016 117 441 | 3/2018 |
| EP | 3 104 447 | 12/2016 |

* cited by examiner

*Primary Examiner* — Wyatt P McConnell
(74) *Attorney, Agent, or Firm* — Gerald E. Hespos; Michael J. Porco; Matthew T. Hespos

(57) ABSTRACT

A safety apparatus (20) for a battery (80) has a base (22) for a vehicle (10), sensors (31, 32, 33, 34) and an evaluation apparatus (40). Each sensor (31, 32, 33, 34) is designed to generate a sensor signal (35) on a basis of a deformation of the base (22) and to supply the sensor signal to the evaluation apparatus (40). The evaluation apparatus (40) ascertains from the sensor signals (35) both first information about the location of the deformation of the base (22) and second information about the level of the deformation, and uses the first information and the second information as a basis for determining whether a first state (Z1) is present, in which a driving mode can be maintained, or whether a second state (Z2) is present, in which a driving mode can no longer be maintained.

16 Claims, 7 Drawing Sheets

SAFETY APPARATUS FOR A BATTERY

CROSS REFERENCE TO RELATED APPLICATION

This application claims priority under 35 USC 119 to German Patent Appl. No. 10 2018 129 158.2 filed on Nov. 20, 2018, the entire disclosure of which is incorporated herein by reference.

BACKGROUND

Field of the Invention

The invention relates to a safety apparatus for a battery.

Related Art

A standard place for batteries in a vehicle is the underfloor area. However, damage to the bodywork in this area can also damage the battery.

EP 3 104 447 A1 shows a system for detecting damage to a battery and for warning. The area of the battery has optical fibers for detecting damage.

DE 10 2013 006 809 A1 shows a battery for a vehicle having a detection apparatus for detecting a deformation of at least one subregion of a battery housing.

DE 10 2016 117 441 A1 shows a battery having cell modules, and a film sensor is provided between each of the cell modules for measuring a mechanical load.

It is an object of the invention to provide a novel safety apparatus for a battery.

SUMMARY

A safety apparatus for a battery has a base part for a vehicle, sensors and an evaluation apparatus. Each sensor is designed to generate a sensor signal on the basis of a deformation of the base part and to supply the sensor signal to the evaluation apparatus. The evaluation apparatus is designed to ascertain from the sensor signals both first information about the location of the deformation of the base part and second information about the level of the deformation. The evaluation apparatus uses the first information and the second information for determining whether a first state Z1 or a second state Z2 is present. The first state Z1 signals that a driving mode can be maintained while the second state signals that a driving mode can no longer be maintained.

The determination of the first state Z1 and the second state Z2 involves both location information and information about the level of the deformation. This leads to a high level of accuracy for assessing the severity of the damage.

According to one embodiment, at least some of the sensors is selected from the group consisting of:
piezoelectric film,
acceleration sensors for ascertaining structure-borne sound,
pressure hoses having pressure sensors,
air pressure sensors,
acceleration sensors for measuring the acceleration of the safety apparatus.

At least some of the sensors may be spatially resolving sensors that can produce a sensor signal with spatially resolved third information about the deformation of the base part. The evaluation apparatus is designed to use the third information to ascertain the first information and the second information. The use of spatially resolving sensors allows very accurate assessment of the effect of the deformation on the vehicle.

The evaluation apparatus has a data interface by means of which a signal having velocity information can be suppliable to the evaluation apparatus, and in which the evaluation apparatus is designed to take the velocity information as a basis for deciding whether the first state or the second state is present. Trials have revealed that velocity is an important criterion for the assessment of underfloor damage, and the use of a signal characterizing the velocity of the vehicle (engine speed, wheel speed, etc.) allows a more accurate forecast of damage.

The safety apparatus may have a signal apparatus, and the evaluation apparatus may be designed so that, on detection of a deformation of the base part, to use the signal apparatus to output an audible or visual signal if the first state Z1 is present despite the deformation. The driver can therefore detect that damage is present, and he can prompt an inspection if need be.

The safety apparatus may have a battery that is protected by the base part. In combination with the battery, a safe overall system is obtained.

The evaluation apparatus may be designed to deactivate the battery on detection of the second state Z2. The deactivation of the battery reduces the risk of injury, and therefore increases safety for the driver or the rescue workers.

The battery may be deactivated by at least one measure from the group consisting of:
opening contactors provided in the battery,
opening a midpack fuse provided in the battery.

Both measures allow a reduction in the voltage, and, in particular in the case of high voltage batteries, opening the midpack fuse is advantageous because it leads at least to the maximum voltages that occur in the vehicle being halved.

The battery may have a cooling apparatus, and the evaluation apparatus may be designed to deactivate the cooling apparatus on detection of the second state Z2. The deactivation of the cooling apparatus prevents or reduces uncontrolled escape of cooling liquid and thereby increases safety.

Further details and advantageous developments of the invention are obtained from the exemplary embodiments described below and depicted in the drawings. These exemplary embodiments are not intended to be a limitation of the invention. The features mentioned above and those yet to be explained below are usable not only in the respective indicated combination but also in other combinations or on their own without departing from the scope of the invention.

DETAILED DESCRIPTION

Figure 1:
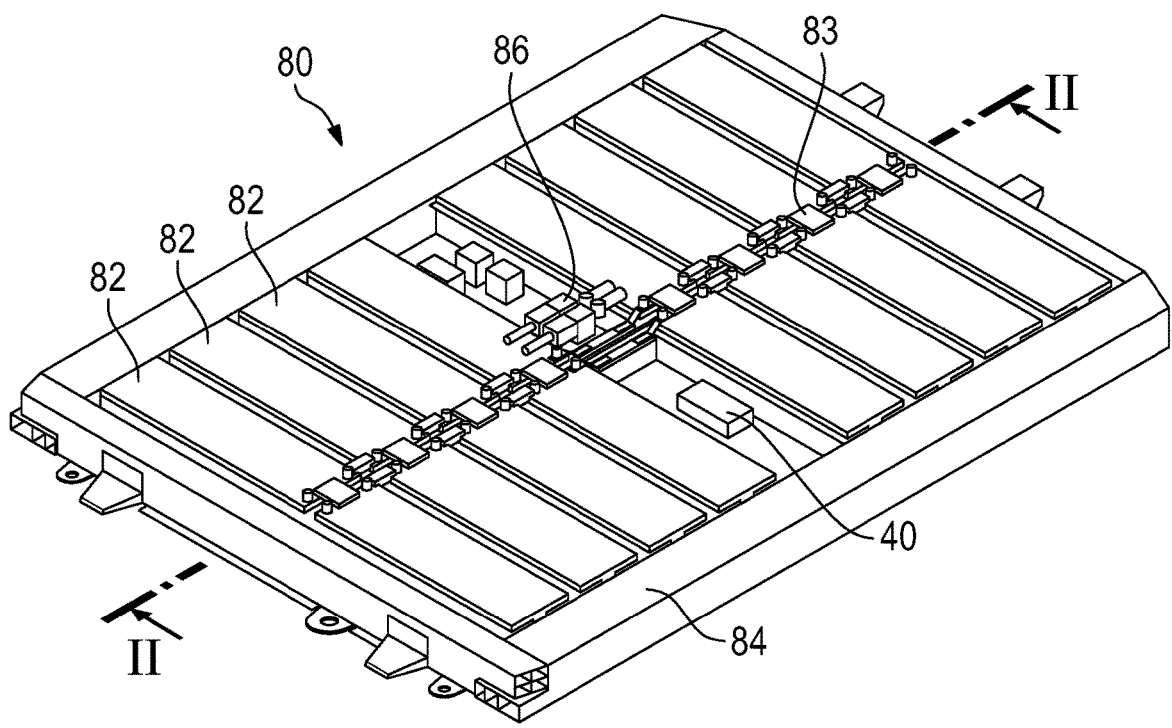
FIG. 1 shows a three-dimensional depiction of a battery having an evaluation apparatus.

FIG. 1 shows a perspective view of a battery 80 for a vehicle, with the battery 80 also being referred to as a battery pack or storage battery pack. The battery 80 has a housing 84, which is visible as a frame in the depiction. The battery 80 in the exemplary embodiment has 16 battery modules 82 that are interconnected with one another by interconnection elements 83. A battery control unit 86 is in a central area of the battery 80 and also is referred to as a battery management system (BMS) or battery management controller (BMC). Moreover, an evaluation apparatus 40 is provided as part of a safety apparatus 20 (cf. FIG. 4).

Figure 2:
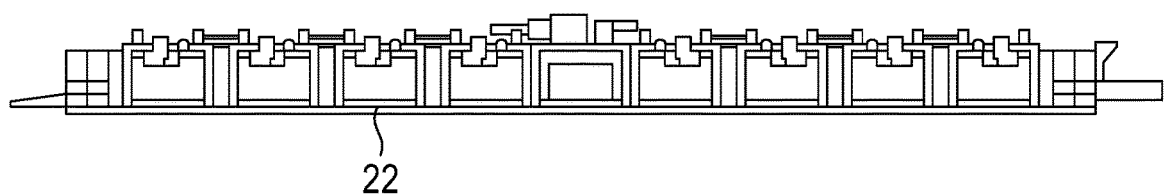
FIG. 2 shows a longitudinal section through the battery from FIG. 1.
Figure 3:
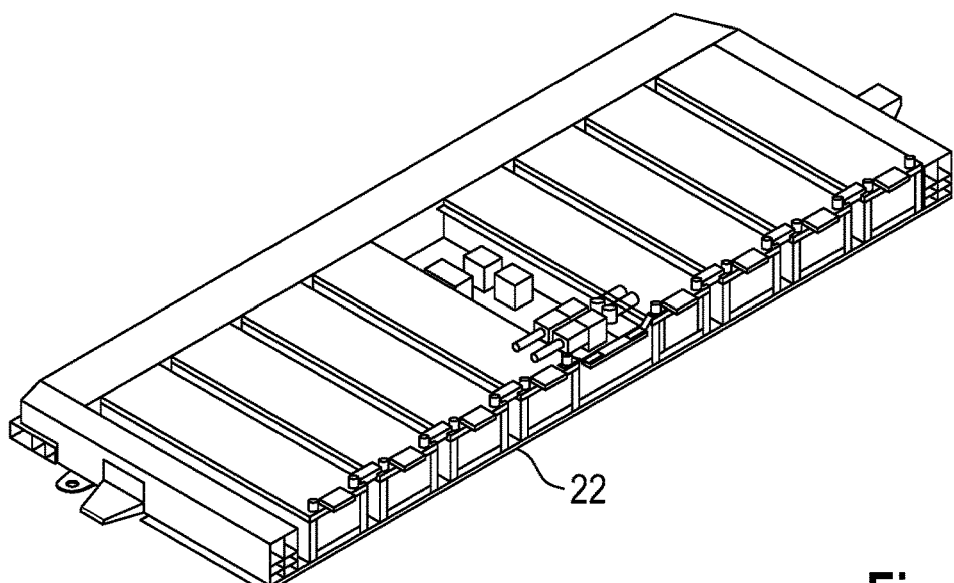
FIG. 3 shows a three-dimensional depiction of the longitudinal section from FIG. 2.

FIG. 2 is a longitudinal section along the line II-II of FIG. 1 through the battery 80, and FIG. 3 is a perspective view of FIG. 2.

The lower area of the battery 80 has a base part 22 for a vehicle. The base part 22 can be a part of the battery housing 84, which in this case is preferably in mechanically robust form. The base part 22 may also be a separate assembly, and there may be an additional bottom (not shown) of the battery housing 84.

Figure 4:
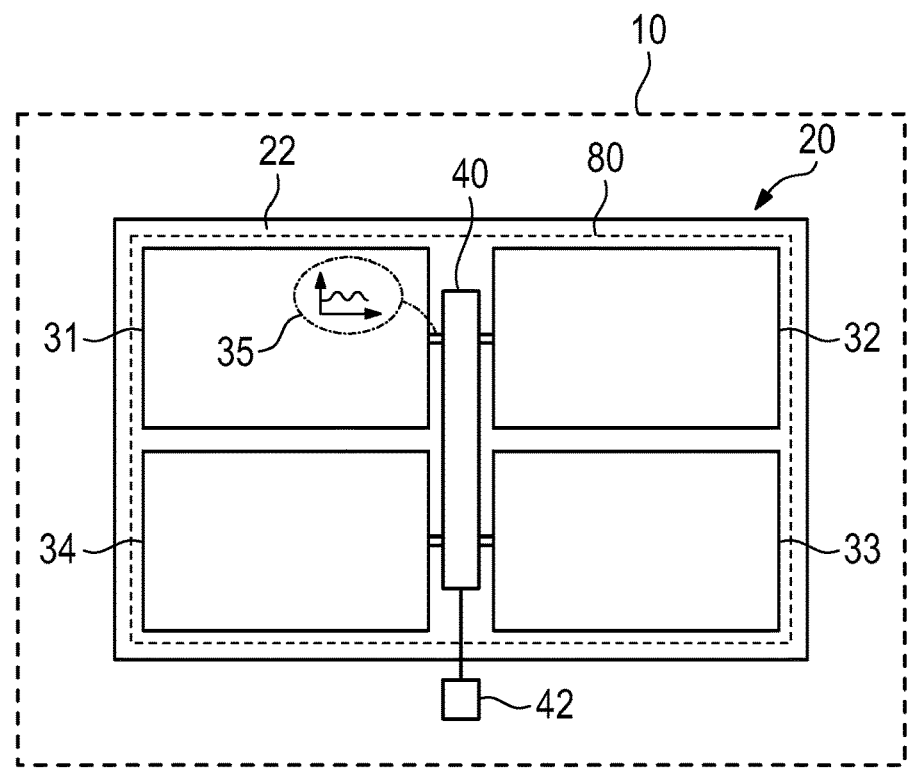
FIG. 4 shows a schematic depiction of an exemplary embodiment of the battery from FIG. 1.

FIG. 4 is a schematic plan view of the battery 80 arranged in a vehicle 10. The battery 40 has a safety apparatus 20 that includes the base part 22, sensors 31, 32, 33 and 34 and the evaluation apparatus 40. Each of the sensors 31, 32, 33, 34 is designed to generate a sensor signal 35 on the basis of a deformation of the base part 22 and to supply the sensor signal to the evaluation apparatus 40. A signal apparatus 42 is connected to the evaluation apparatus 40 and can output for example an audible or visual signal.

At least some of the sensors 31, 32, 33, 34 preferably are spatially resolving sensors whose sensor signal 35 has spatially resolved information about the deformation of the base part 22. The evaluation apparatus 40 preferably uses this information to ascertain the location of the deformation of the base part and the extent of the deformation.

To this end, the evaluation apparatus can determine that damage in specific prescribed areas is more critical than in other areas. The applicable areas can be stipulated in advance, for example by computer simulation or by accident trials.

Figure 5:
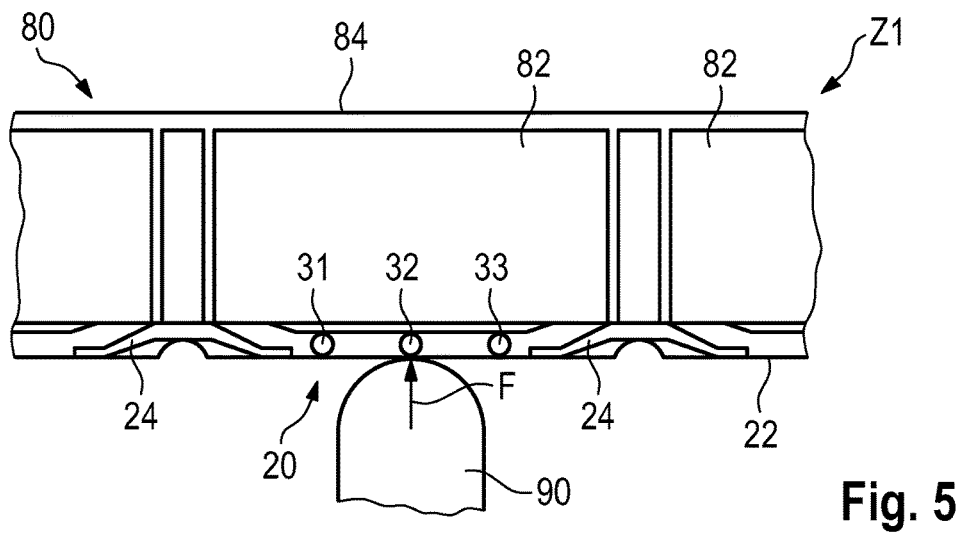
FIG. 5, FIG. 6 and FIG. 7 show a longitudinal section through a further exemplary embodiment of the battery from FIG. 1.

FIG. 5 shows a detail corresponding to FIG. 2 for an embodiment of the safety apparatus 20. Struts 24 are provided in the area of the base part 22 for stiffening the base part 22 and the battery housing 84. Three sensors 31 in the form of pressure hoses are provided in the area between the base part 22 and one of the battery modules 82. The pressure hoses are filled with a liquid or gaseous fluid, and the sensors 31 have a pressure ascertainment apparatus that measures the pressure in the pressure hoses 31 and can generate a signal on the basis of the pressure. In the area beneath the base part 22, a bollard 90 is depicted in exemplary fashion. The bollard pushes against the base part 22 with a force F. This can occur for example when a lowerable bollard 90 is moved up while the vehicle 10 is above. In the depiction, the bollard 90 bears against the base part 22, but a deformation has not yet occurred. The vehicle 10 is in a first state Z1, in which a driving mode can be maintained.

Figure 6:
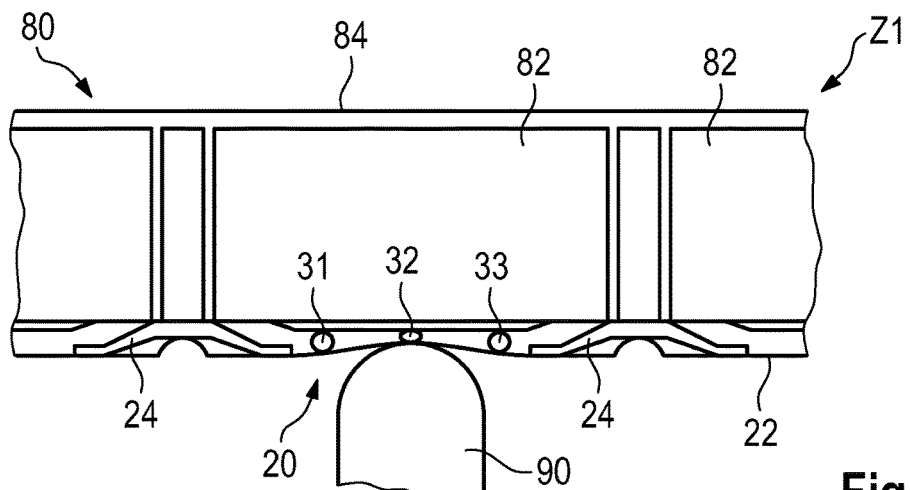

FIG. 6 shows a depiction corresponding to FIG. 5 where the bollard 90 has deformed the base part 22 to a greater extent. Deformation of the struts 24 has also occurred, and the base part 22 has come into contact with the battery module 82. The sensors 31, 32, 33 and the pressure hoses thereof are deformed, and the smaller volume means that an increase in the pressure of the fluid provided in the pressure hoses arises. The vehicle 10 is still in the state Z1, and the driving mode can be maintained.

Figure 7:
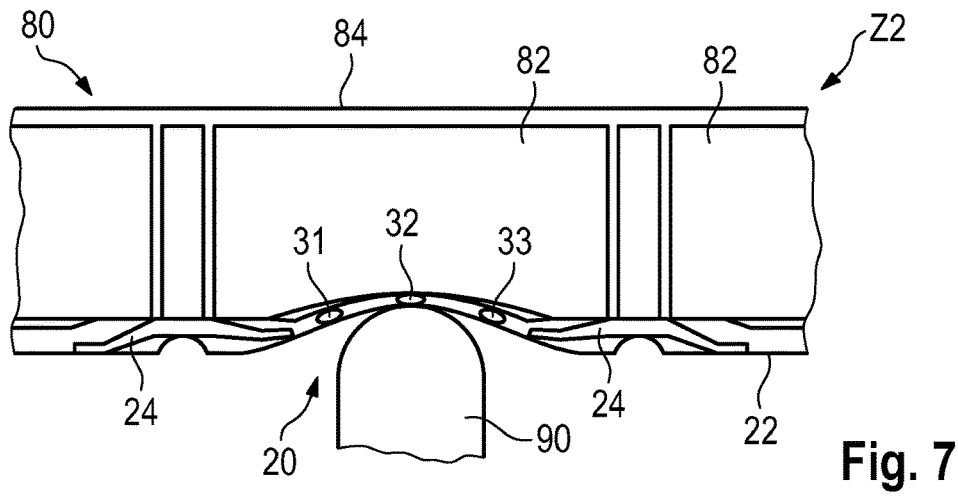

FIG. 7 shows a depiction corresponding to FIG. 5 and FIG. 6 where a further deformation of the base part 22 has occurred as a result of the bollard 90. The base part 22 is deformed to such an extent that it has entered the area of the battery module 82, and destruction of the battery module 82 is expected. The vehicle 10 is in a second state Z2, in which a driving mode can no longer be maintained. First, the destruction of the battery module 82 can result in a short that, owing to the high electrical energy density, can lead to severe heating of the battery 80. Secondly, other systems such as the cooling system may have been destroyed, and safe operation of the battery 80 is therefore no longer ensured.

The evaluation apparatus 40 of FIG. 4 is designed to take the sensor signals as a basis for determining whether the first state Z1 is present, in which a driving mode can be maintained, or whether the second state Z2 is present, in which a driving mode can no longer be maintained. In this case, it is advantageous if the evaluation apparatus 40 does not prescribe the second state Z2 early, even though the battery 80 is still operational. Furthermore, the second state Z2 needs to be detected as safely as possible if the battery 80 is destroyed and there is a safety risk.

The evaluation apparatus 40 has both first information about the location of the deformation of the base part 22, for example via the spatially resolving sensors 31, 32, 33 or via the information concerning which of the sensors 31, 32, 33 sends the signal, and it also has second information about the level of the deformation. This allows a comparatively high level of accuracy to be attained for the forecast of the state Z1 or Z2. The information about the location of the deformation has the advantage that for example it is possible to take into consideration that damage in specific areas is less critical than in others (for example in the area of the cooling or the control electronics). By way of example, it is additionally possible to take into consideration that the intrusion by the bollard or, generally, foreign bodies is dependent on the local robustness of the base. If intrusion is therefore detected in a robust area, severe damage can be assumed.

The evaluation apparatus that forecasts that the second state Z2 can react in different ways.

For example, contacts inside and/or outside the battery can be opened to prevent a flow of current. The driver then can be asked to switch off the automobile and/or the maximum velocity of the vehicle can be limited to a low value. A change to the second state Z2 can result in the battery 80 being deactivated.

The battery 80 preferably is deactivated by at least one measure from the group consisting of:
opening contacts in the battery,
opening a midpack fuse in the battery 80.

The deactivation increases safety, both for the driver and possibly for rescuers.

If the battery 80 has a cooling apparatus, the evaluation apparatus 40 preferably is designed to deactivate the cooling apparatus on detection of the second state Z2. The deactivation of the cooling apparatus allows an escape of coolant to be prevented or reduced.

Figure 8:
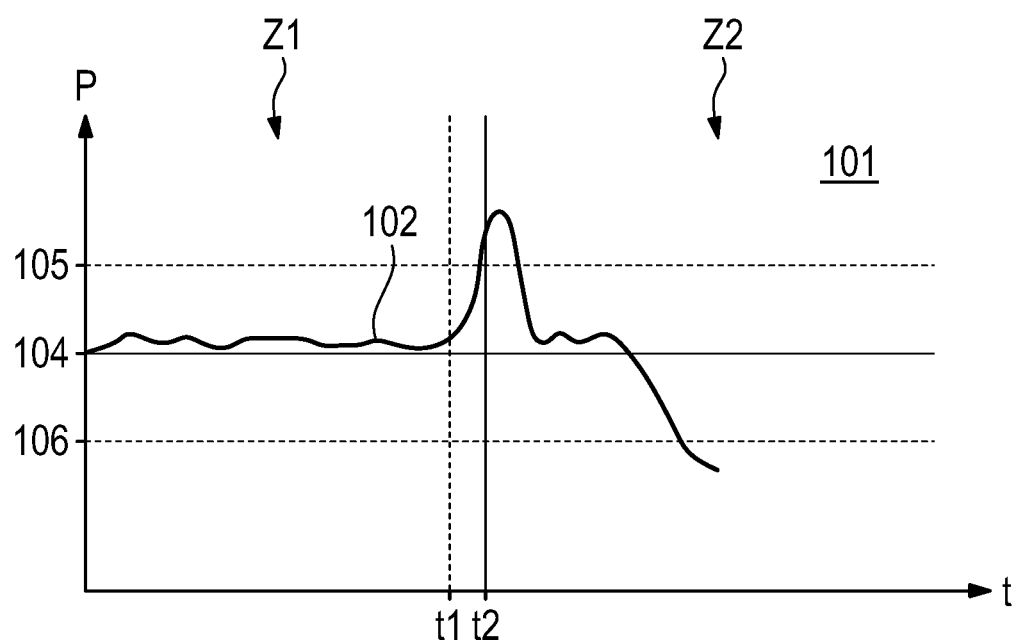
FIG. 8 shows a graph plotting the pressure for an instance of damage over time.

FIG. 8 shows a graph 101 in which pressure P is plotted as a line 102 over time t. The line 104 denotes normal pressure, the line 105 an upper threshold value and the line 106 a lower threshold value. Changes in the sensor signal 102 arise even without deformation of the base 22. At the time t1, the bollard 90 of FIG. 5 contacts the base 22, and the base 22 deforms. As a result, the pressure in the applicable sensor 31 rises, and at a time t2 the pressure exceeds the upper threshold value 105. As a result, it can be assumed that the deformation in the area of the applicable sensor 31 is so severe that there is damage to the battery 80. The state therefore changes to the second state Z2. If the bollard 90 is moved downward again, or if the pressure hose sensor 31 is destroyed by the deformation, a drop in the pressure P occurs, and the pressure falls below the lower threshold value 106. The upper threshold value 105 preferably is dependent on the sensor or the location from which the signal for the deformation comes. As a result, the location of the deformation is ascertained and taken into consideration.

Figure 9:
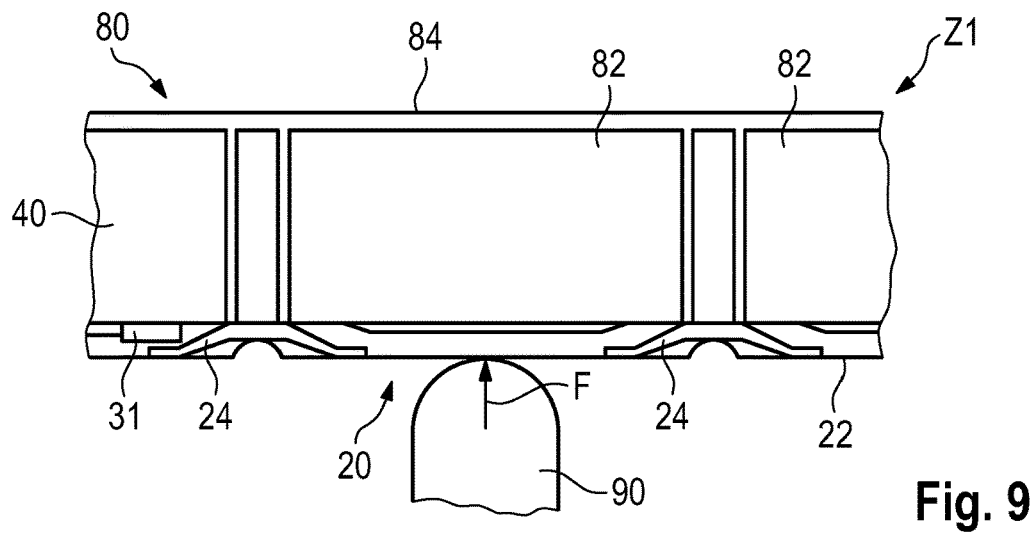
FIG. 9, FIG. 10 and FIG. 11 show a longitudinal section through a further exemplary embodiment of the battery from FIG. 1.

FIG. 9 shows a detail corresponding to FIG. 5 but for a further embodiment of the safety apparatus 20. The evaluation apparatus 40 is provided in a left area, and a sensor 31 is on the evaluation apparatus 40. The sensor 31 is an air pressure sensor that generates a sensor signal on the basis of the air pressure in the area of the battery 80. The bollard 90 pushes against the base part 22 with a force F, and a deformation has not yet occurred. The vehicle 10 is in the first state Z1.

Figure 10:
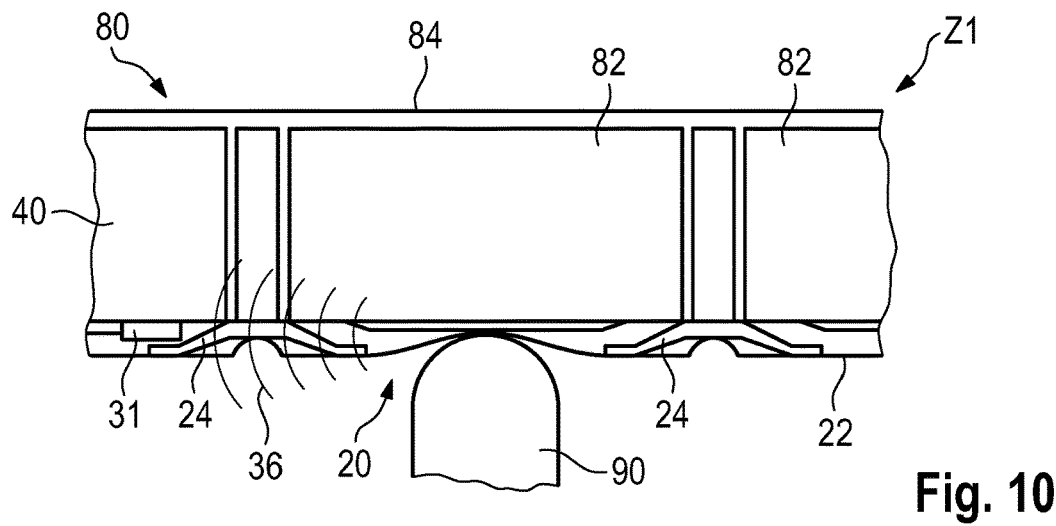

FIG. 10 shows a depiction corresponding to FIG. 9, but after a deformation of the base 22 has taken place. The battery module 82 is not damaged and the vehicle 10 continues to be in the first state Z1.

Figure 11:
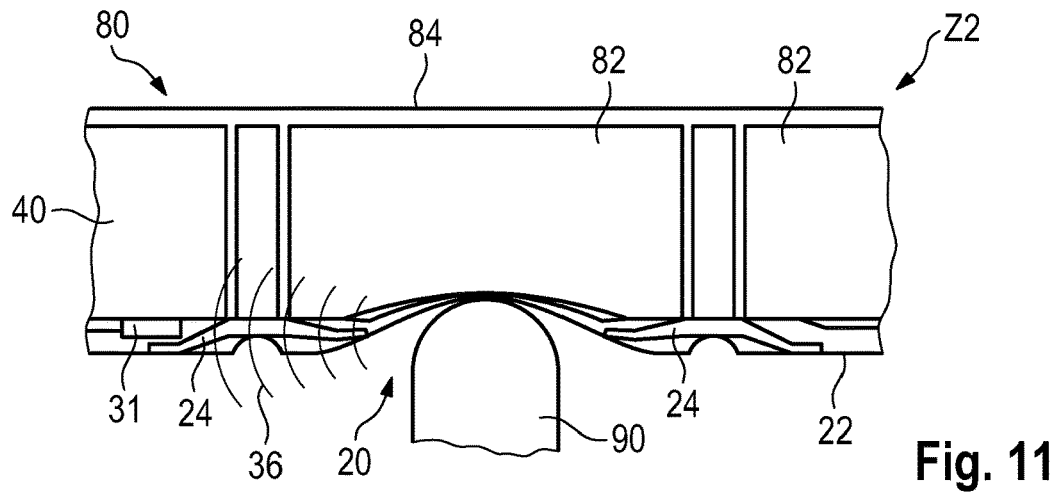

FIG. 11 shows a further intrusion by the bollard 90 and a related deformation of the base 22 into the battery module 82. The vehicle 10 is therefore in the second state Z2.

Figure 12:
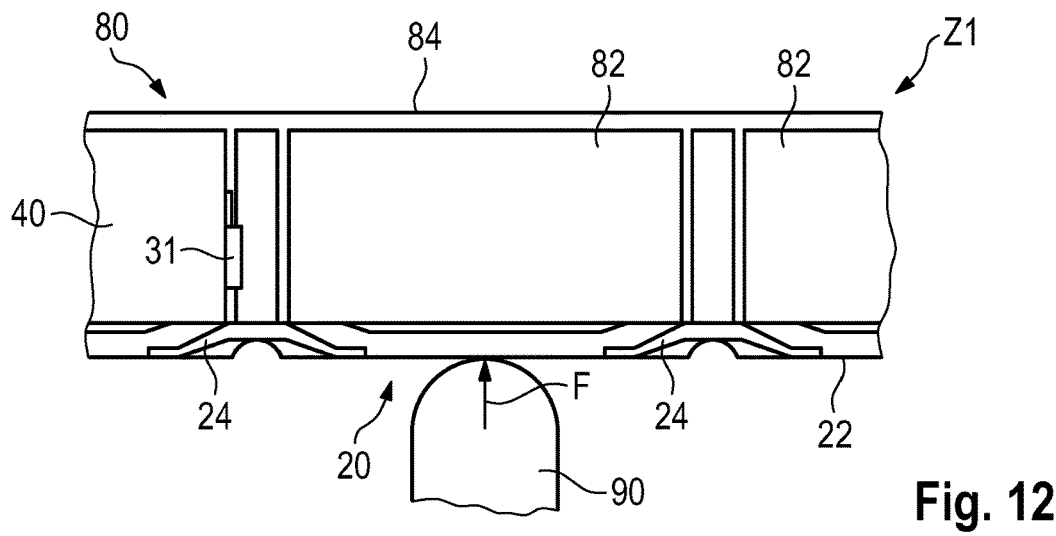
FIG. 12, FIG. 13 and FIG. 14 show a longitudinal section through a further exemplary embodiment of the battery from FIG. 1.

FIG. 12 shows a detailed depiction corresponding to FIG. 9 but with a further exemplary embodiment of the safety apparatus 20. The safety apparatus 20 has a sensor 31 in the form of a structure-borne sound sensor. Structure-borne sound is sound that propagates in a solid. The bollard 90 has not deformed the base 22, and the vehicle 10 is in the first state Z1.

Figure 13:
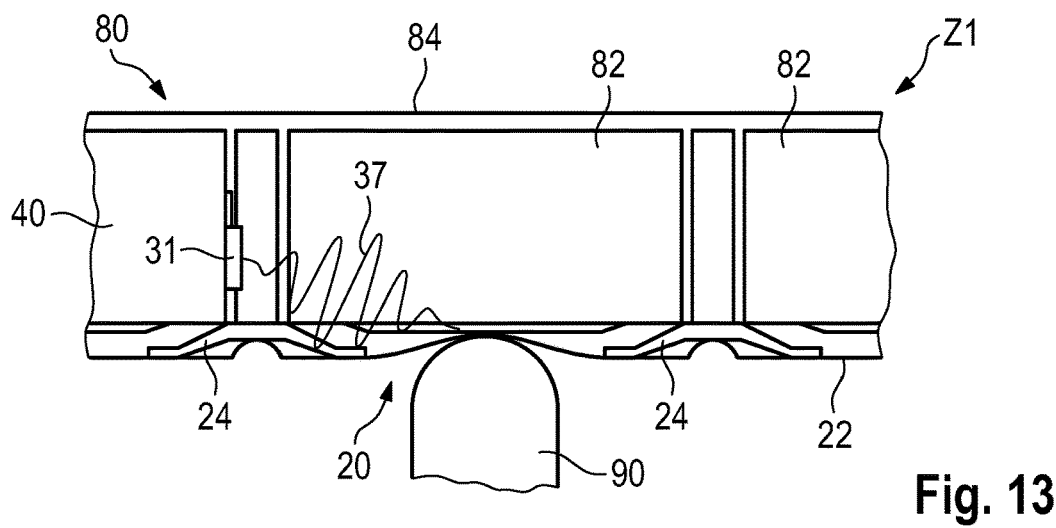

FIG. 13 shows an intrusion by the bollard 90 into the battery 80 beyond the intrusion of FIG. 12. The base 22 is deformed, but the deformation has not yet led to damage to the battery module 82. As soon as the bollard 90 is in contact with the base part 22, structure-borne sound is generated and can be detected by the sensor 31. The vehicle 10 continues to be in the first state Z1.

Figure 14:
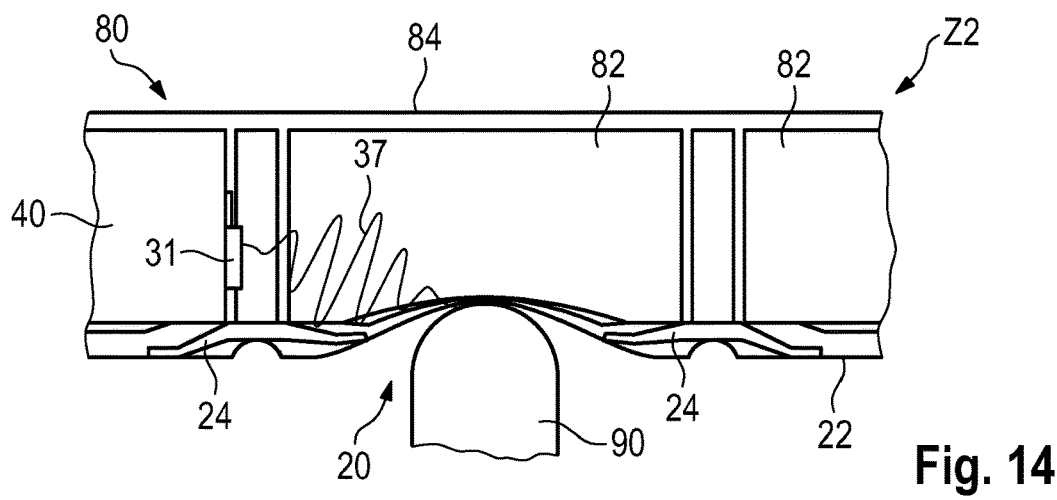

FIG. 14 shows a severe intrusion by the bollard 90 into the area of the battery 80. The base 22 is deformed with sufficiently severity to extend into the area of the battery module 82. Damage to the battery module 82 must be expected. The deformation of the battery module 82 leads to characteristic generation of structure-borne sound that can be detected by the sensor 31 and output to the evaluation apparatus 40.

Figure 15:
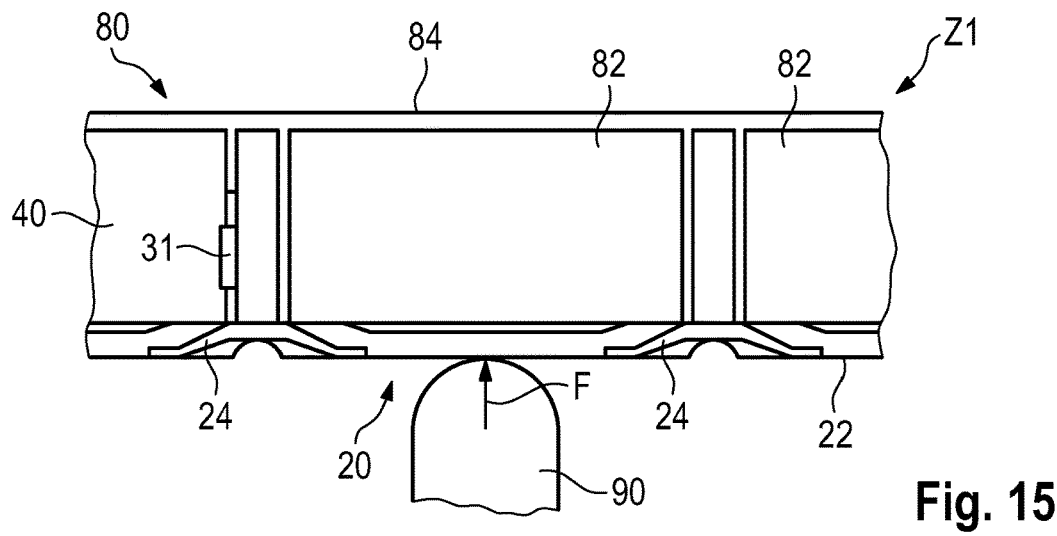
FIG. 15, FIG. 16 and FIG. 17 show a longitudinal section through a further exemplary embodiment of the battery from FIG. 1.

FIG. 15 is a depiction corresponding to FIG. 12 but for a further embodiment of the safety apparatus 20 in which the sensor 31 is an acceleration sensor. The bollard 90 bears against the base part 22, but deformation has not yet taken place. Thus, the first state Z1 is present.

Figure 16:
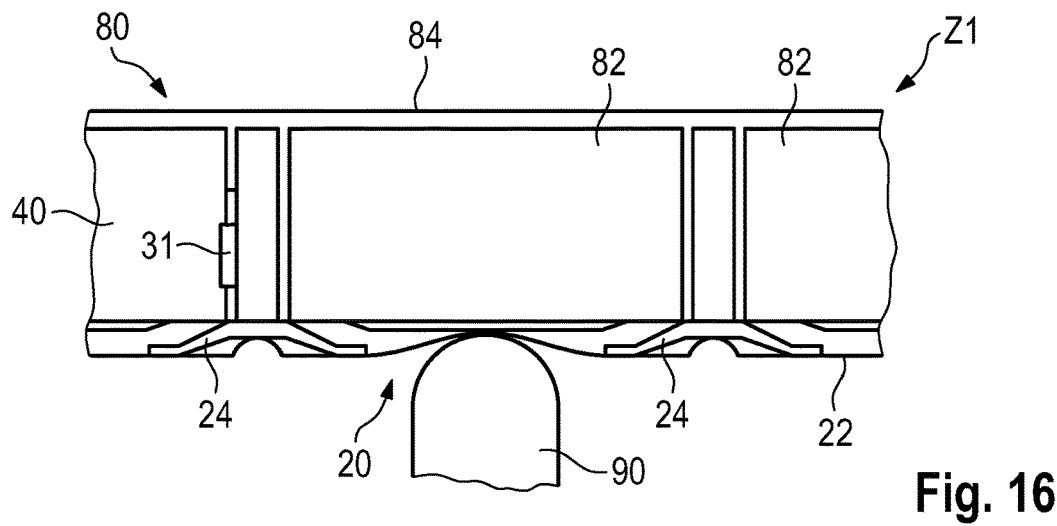

FIG. 16 shows the battery 80 after a further movement of the bollard 90. The base part 22 is deformed farther but has not yet damaged the battery module 82. Thus, the first state Z1 still is present.

Figure 17:
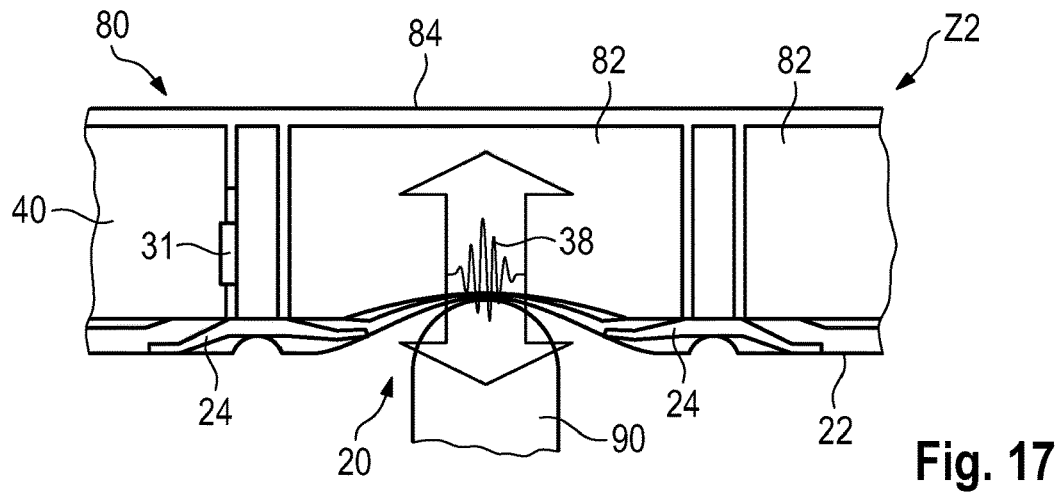

FIG. 17 shows the battery 80 after a more extensive intrusion by the bollard 90. The base 22 has intruded into the battery module 82, and leads to an acceleration of the battery module 82. This acceleration can be detected by the acceleration sensor 31, and this detection can be taken as a basis for inferring the second state Z2.

Naturally, many different variations and modifications are possible within the framework of the present invention.

The evaluation apparatus 40 has a data interface or input apparatus that supplies to the evaluation apparatus 40 a signal containing velocity information for the vehicle. The evaluation apparatus 40 takes the velocity information 40 as a basis for deciding whether the first state Z1 or the second state Z2 is present. As such, it can be assumed for example that the same deformation is more critical if the vehicle has a velocity of 30 km/h (crossing a bollard) than if the velocity is less than 3 km/h (for example in the case of a movable bollard). Conversely, a family of characteristic curves can be prescribed that indicates what depth of intrusion is acceptable at what velocity.

What is claimed is:

1. A safety apparatus for a battery that has at least one battery module and a housing with a base disposed outward from the at least one battery module, the safety apparatus comprising:
   fluid pressure sensors disposed between the at least one battery module and the base, each of the fluid pressure sensors being designed to generate a sensor signal on the basis of a fluid pressure change indicative of a deformation of the base; and
   an evaluation apparatus connected to the fluid pressure sensors, the evaluation apparatus being designed to ascertain from the sensor signals both first information about the location of the deformation of the base part and second information about the amount of the deformation, and
   the evaluation apparatus being designed to take the first information and the second information as a basis for determining whether a first state is present and generates signals that a driving mode can be maintained, or whether a second state is present in which a driving mode can no longer be maintained.

2. The safety apparatus of claim 1, wherein at least some of the fluid pressure sensors are selected from the group consisting of:
   pressure hoses having pressure sensors, and
   air pressure sensors.

3. The safety apparatus of claim 1, wherein at least some of the sensors are spatially resolving sensors whose sensor signal has spatially resolved third information about the deformation of the base part, and the evaluation apparatus is designed to use the third information to ascertain at least one of the first information and the second information.

4. The safety apparatus of claim 1, further comprising a data interface that supplies to the evaluation apparatus a signal having velocity information, and the evaluation apparatus using the velocity information for deciding whether the first state or the second state is present.

5. The safety apparatus of claim 1, further comprising a signal apparatus and wherein, on detection of a deformation of the base, the evaluation apparatus uses the signal apparatus to output an audible or visual signal if the first state is present.

6. The safety apparatus of claim 1, further comprising a battery, which battery is protected by the base part.

7. The safety apparatus of claim 6, wherein the evaluation apparatus deactivates the battery on detection of the second state.

8. The safety apparatus of claim 7, wherein the battery is deactivated by at least one measure from the group consisting of:
opening contacts provided in the battery,
opening a midpack fuse provided in the battery.

9. The safety apparatus of claim 6, wherein the battery has a cooling apparatus, and the evaluation apparatus is configured to deactivate the cooling apparatus on detection of the second state.

10. The safety apparatus of claim 1, wherein the fluid pressure sensors comprise pressure hoses spaced from one another at positions between the at least one battery module and the base, the pressure hoses having pressure sensors that sense amounts of deformation of the base toward the at least one battery module at the positions of the respective pressure hoses.

11. The safety apparatus of claim 10, wherein the housing has first and second struts extending from the base, and the at least one battery module is between the first and second struts, the pressure hoses are spaced from the first and second struts.

12. The safety apparatus of claim 1, wherein the fluid pressure sensors comprise air pressure sensors between the at least one battery module and the base.

13. A safety apparatus for a battery that has at least one battery module and a housing with a base disposed outward from the at least one battery module, the safety apparatus comprising:

structural borne sound sensors mounted to the housing and designed to generate sensor signals on a basis of sounds indicative of a deformation of the base; and an evaluation apparatus connected to the structural borne sound sensors, the evaluation apparatus being designed to ascertain from the sensor signals both first information about the location of the deformation of the base part and second information about the amount of the deformation, and the evaluation apparatus being designed to take the first information and the second information as a basis for determining whether a first state is present and generates signals that a driving mode can be maintained, or whether a second state is present in which a driving mode can no longer be maintained.

14. The safety apparatus of claim 13, wherein at least some of the sensors are spatially resolving sensors whose sensor signal has spatially resolved third information about the deformation of the base part, and the evaluation apparatus is designed to use the third information to ascertain at least one of the first information and the second information.

15. The safety apparatus of claim 13, further comprising a data interface that supplies to the evaluation apparatus a signal having velocity information, and the evaluation apparatus using the velocity information for deciding whether the first state or the second state is present.

16. The safety apparatus of claim 13, further comprising a signal apparatus and wherein, on detection of a deformation of the base, the evaluation apparatus uses the signal apparatus to output an audible or visual signal if the first state is present.

* * * * *